United States Patent [19]

Kikuchi et al.

[11] Patent Number: 4,819,189

[45] Date of Patent: Apr. 4, 1989

[54] COMPUTER SYSTEM WITH MULTIWINDOW PRESENTATION MANAGER

[75] Inventors: Kiyoshi Kikuchi, Kanagawa; Akio Mori, Tokyo, both of Japan

[73] Assignee: Kabushiki Kaisha Toshiba, Kawasaki, Japan

[21] Appl. No.: 52,374

[22] Filed: May 21, 1987

[30] Foreign Application Priority Data

May 26, 1986 [JP] Japan ................................ 61-120898

[51] Int. Cl.$^4$ ............................................. G06F 15/72
[52] U.S. Cl. ................................... 364/521; 340/734; 340/721; 340/723; 382/49
[58] Field of Search ...................... 364/518, 521, 300; 340/706, 711, 720, 721, 734, 723, 709, 712; 382/49

[56] References Cited

U.S. PATENT DOCUMENTS 4,542,376  9/1985  Bass et al. ........................... 340/724
4,555,775  11/1985  Pike ..................................... 364/900
4,586,035  4/1986  Baker et al. ......................... 340/712

OTHER PUBLICATIONS

Sun Microsystems, Windows and Window Based Tools: Beginner's Guide, p. 40 Exposing Windows.

*Primary Examiner*—Gary V. Harkcom
*Assistant Examiner*—Randy W. Lacasse
*Attorney, Agent, or Firm*—Oblon, Fisher, Spivak, McClelland & Maier

[57] ABSTRACT

A terminal computer used as a workstation has a display unit which displays a desired number of windows on its display screen, allowing the windows to overlap one upon another. Plural pieces of data specifying the positions and sizes of the windows are stored into a memory. Data representing the display priorities of the windows are stored into another memory. A coordinate input device, known as "a mouse," is manually operated by an operator, and a cursor displayed on the screen of the display unit moves with movement of the mouse on a flat surface. The most current coordinates of the cursor on the screen are stored as present-cursor position data into a memory. A window presentation controlling section is provided for comparing the present-cursor position data with the positions and sizes of the windows. When the cursor is detected to have moved into one window on the screen, the window presentation controlling section controls the display unit to automatically move this window in front of the other windows on the screen. In this case, the frontmost window is entirely visible, while the other windows are hidden at least partially behind that window.

9 Claims, 4 Drawing Sheets

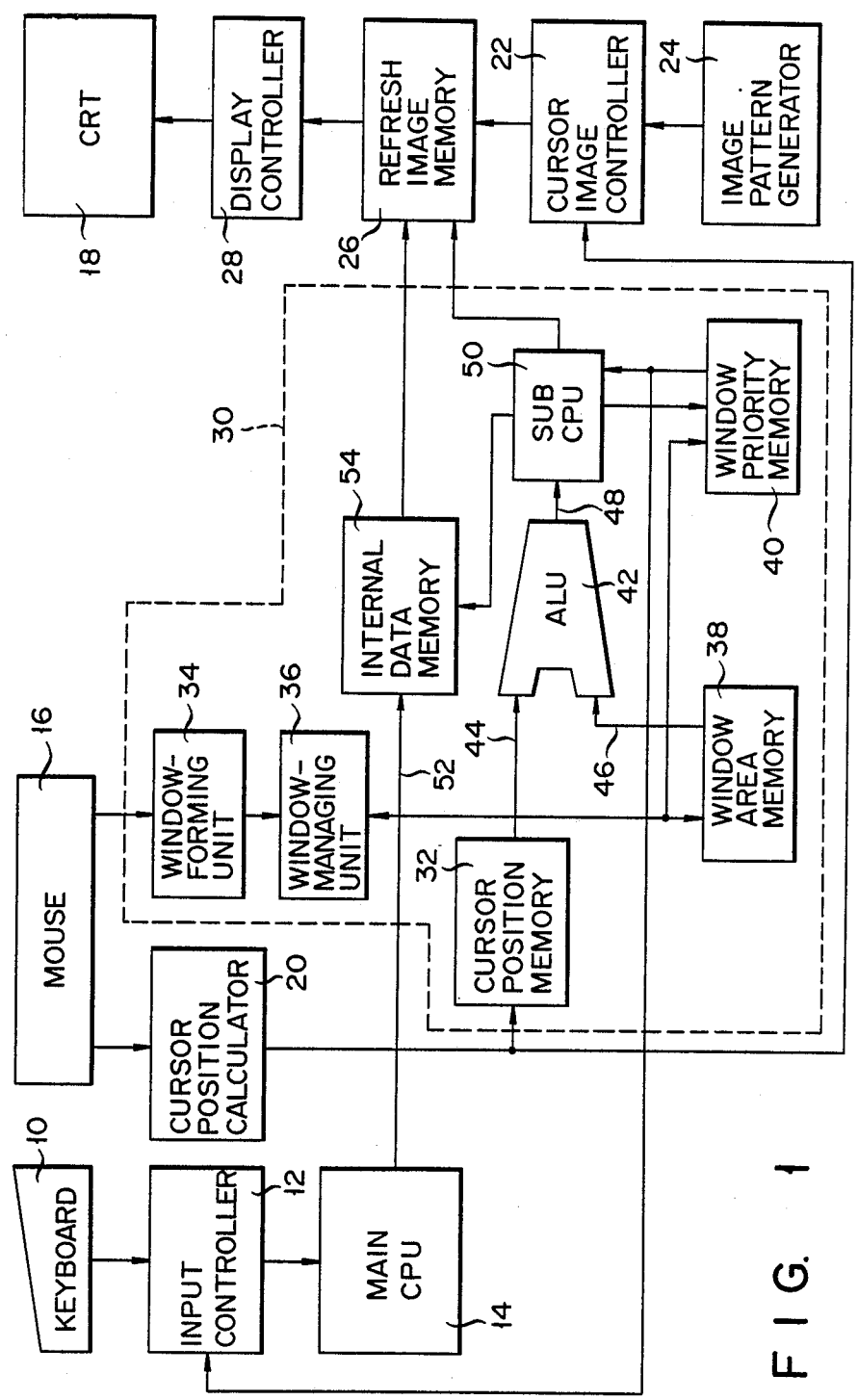
F I G. 1

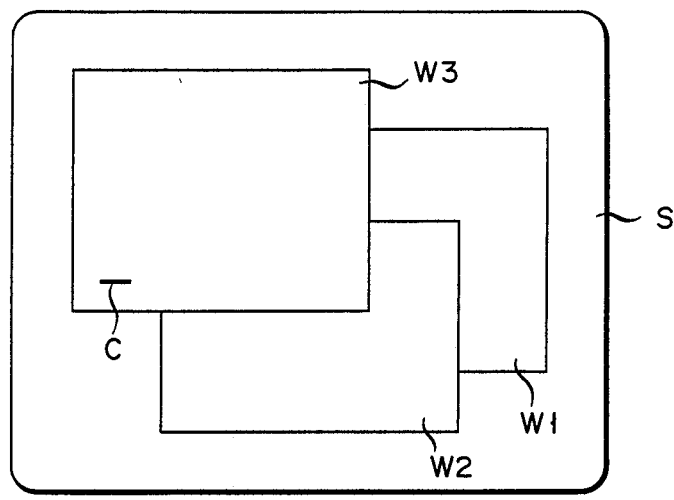
F I G. 2A
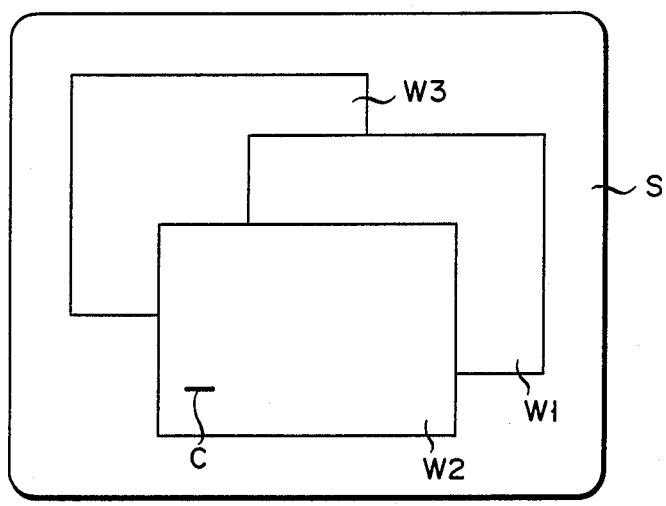
F I G. 2B

COMPUTER SYSTEM WITH MULTIWINDOW PRESENTATION MANAGER

BACKGROUND OF THE INVENTION

This invention relates to a computer system with an image display device and, more particularly, to a multiwindow display device, which is adapted for use in a computer used as a workstation and forms or opens several windows on a display screen, any one of which can be rendered active as required by an operator.

Recently, it becomes popular to support a "multiwindow manager" in an image display device for use in a workstation. The "multiwindow manager" ensures that a plurality of rectangular image regions (called "windows") on the display screen of the display device, which can overlap one upon another, and that the individual windows function as if each is an independent single image screen. The way the windows are formed or opened on the display screen resembles a plurality of paper documents lying on an office desk, with the document desired for reference on the top. Through an operator's manipulation, it is free to change the window-overlapping order to make any desired window active, change the size of each window or move it around. When a window is selected, its corresponding region on the display screen functions as if it is an independent screen of the display device.

A window on which the operator is working at the moment is generally called "an active window." When a window becomes active, the priority of window display changes and the active window moves on top or in front of the other windows. All the image region of the active window is thus visible, the remaining windows being partially or entirely hidden under the active window.

In conventional manner, in order to select a desired window from among overlapping windows on the display screen and move it to the front, that is, to make the desired window active, a pointing device such as a well-known "mouse" is used. According to an existing operation, the operator watches the screen while rolling the mouse on a flat surface to position a displayed pointing image, a pointer, on a frame line or an icon pattern of the desired window. With an appropriate mouse button pressed, the active window moves on top; this active, frontmost window can be zoomed to nearly fill the display screen. The same procedures should be taken for making another window active.

According to the conventional, manual multiwindow presentation control technique, to make a desired window active, the operator needs to operate a mouse button for each window activation action, thus making the operation troublesome. Particularly, when the operator frequently uses a plurality of windows to perform a task with a workstation, a required manual operation sequence of mouse movement and mouse button operations becomes a critical problem to efficient task execution. This is because the operator's thought has to be interrupted every time the desired window is selected. Consequently, it is unlikely that the operator can utilize the inherent advantages of the multiwindow function.

SUMMARY OF THE INVENTION

It is therefore an object of the present invention to provide a new and improved multiwindow display control device, which simplifies an operator's operation for making any desired window active and thus ensures maximum utilization of the inherent advantages of a multiwindow function.

In accordance with the above object, the present invention is addressed to a specific multiwindow display control device, which has a display device that displays on its display screen independent image display regions, known as "windows," allowing these windows to overlap one upon another. A first memory section is connected to the display device and stores different window coordinate data, which specify the positions and sizes of the independent windows on the screen. A cursor display unit is connected to the display device and is responsive to a manual operation of an operator to move a cursor displayed on the screen. A second memory section is connected to the cursor display unit and stores present-cursor position data representing the latest coordinates of the cursor on the screen.

A window managing unit is coupled to first and second memory sections and the display device, and compares the present-cursor position data with the window coordinate data. When it is detected that the cursor moves into one of independent image display regions on the screen, the window managing unit controls the display device so as to automatically move the image display region in front of the other image display regions on the screen. Accordingly, the frontmost image display region is entirely visible, while the others are hidden at least partially behind the frontmost image display region.

The above object and other objects as well as advantages of the present invention will become apparent to those skilled in the art as the detailed description of a preferred embodiment proceeds.

BRIEF DESCRIPTION OF THE DRAWINGS

In the detailed description of a preferred embodiment of the present invention presented below, reference is made to the accompanying drawings wherein:

FIG. 1 is a schematic block diagram of the overall arrangement of a workstation that includes a multwindow presentation control device according to a preferred embodiment of this invention;

FIGS. 2A to 2D are diagrams showing the contents of the screen of an image display unit, provided in the workstation, in different display modes in which windows overlap one upon another differently.

DETAILED DESCRIPTION OF THE PREFERRED EMBODIMENT

Figure 2C:
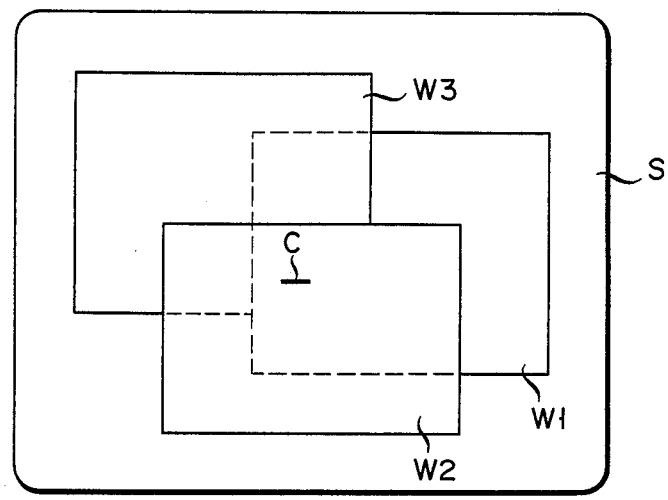

FIG. 1 schematically illustrates the overall system arrangement of a workstation that includes a multiwindow presentation controlling device according to a preferred embodiment of the present invention. In this system, a keyboard 10 is provided for entry for information, such as various control commands, character data and graphic data, which are used for information processing. Keyboard 10 is connected through an input controller 12 to a main CPU 14 that performs various information processings. The workstation includes a coordinate pointing device 16, constituted by a mouse, a tablet, or the like. In this embodiment, a mouse is used as pointing device 16. When mouse 16 is rolled or moved on a flat surface (not shown) by an operator, a pointer image or a cursor (indicated by "C" in FIG. 2A)

displayed on the display screen ("S" in FIG. 2A) of a CRT display unit 18 moves accordingly to desired coordinates on the screen S (see FIG. 2A). With the use of mouse 16, therefore, it is possible to easily and quickly specify any desired coordinates on the display screen.

Mouse 16 is connected to a cursor position calculator 20, which calculates the coordinates of the cursor on the display screen S (see FIG. 2A) of CRT display unit 18 substantially in real time in accordance with the movement of mouse 16 on the flat surface, and generates cursor position data. The cursor position data is supplied to a cursor image controller 22, which is connected to a cursor image pattern generator 22 and a refresh image memory 26, which may be a bit-mapped memory serving as a video RAM. Refresh image memory 26 has a memory space corresponding to one display screen of CRT display unit 18, and is connected to the display unit via a typical display controller 28.

Cursor image controller 26 writes a cursor image pattern from pattern generator 24 into image memory 26 at a suitable memory address specified by the cursor position data. The cursor image written into image memory 28 is displayed by display controller 28 at corresponding coordinates on the display screen of CRT display unit 18. Since the cursor display process by cursor image controller 22 is performed substantially in real time (i.e., at a high speed), the cursor continuously and smoothly moves on the display screen in accordance with the movement of mouse 16 on the flat surface. Accordingly, the faster the mouse movement on the flat surface, the faster the cursor movement on the display screen.

Main CPU 14 and mouse 16 are connected to a window presentation controlling section 30, which carries out the general management of windows formed or opened on the screen of display unit 18 by the operator, using mouse 16. More specifically, in response to instructions from the operator, window presentation controlling section 30 may (1) change the window-overlapping order to make any desired window active, (2) change the size of each window or (3) move it around on the screen.

Window presentation controlling section 30 has a random access memory (RAM) 32 to which the cursor position data from cursor position calculator 20 is also supplied. RAM 32 temporarily stores the output data of cursor position calculator 20 as present-cursor position data; it also stores the last-cursor position data. When the cursor position data changes according to the movement of mouse 16 on the flat surface, RAM 32 updates its contents so as to store new data from cursor position calculator 20 as the present-cursor position data. Table 1 below is a model representation of how the position data is stored in RAM 32 serving as a cursor position memory.

TABLE 1

|  | Cursor Position | |
| --- | --- | --- |
|  | X Coordinate | Y Coordinate |
| Present Cursor Position | x1 | y1 |
| Old Cursor Position | x2 | y2 |

Obviously, the data table of RAM 32 is updated with movement of mouse 18. Throughout the following description, RAM 32 will be referred to as "cursor position memory."

Window presentation controlling screen 30 also has a window forming unit 34, connected to mouse 16. When the operator enters data to define the position and the size of a new rectangular window to form or open that window using mouse 16, this data is transferred to window forming unit 34. Based on the input data, window forming unit 34 generates data to specify the new window. This data is supplied to a window managing unit 36. Window managing unit 36 refers to the windows opened already, and determines the window manner and the display priority for the new window. The window number and management codes representing the display priority are affixed to the received window-specifying data and are supplied to two RAMs 38 and 40.

RAM 38 receives and stores that portion of the output data of window managing unit 38 which are associated with the window number and the window size (i.e., coordinate data representing the coordinates of two corner points, which diagonally face each other on the display screen and define the area of the new rectangular window). Table 2 below shows how the data is stored in RAM 38.

TABLE 2

| Window No. | Coordinates of Upper-left Corner Point | Coordinates of Lower-right Corner Point |
| --- | --- | --- |
| 01 | (x11, y11) | (x12, y12) |
| 02 | (x21, y21) | (x22, y22) |
| 01 | (x31, y31) | (x32, y32) |
| . | . | . |
| . | . | . |
| . | . | . |
| n | (xn1, yn1) | (xn2, yn2) |

The window number for the newly-opened window is represented by "n" in the above Table 2. That is, RAM 38 stores data representing the areas of the windows on the screen in the order they are opened. In the following description, RAM 38 will be referred to as "window area memory."

RAM 40 receives the stores that portion of the output data of window managing unit 36 which is associated with the display priority. The display priorities of the opened windows on the screen of CRT display unit 18 are initially deterined by window managing unit 36 in such a manner as to coincide with the order they have been opened. Table 3 below shows how the data is stored in RAM 40.

TABLE 3

| Window No. | Display Priority |
| --- | --- |
| 01 | n |
| 02 | n−1 |
| 03 | n−2 |
| . | . |
| . | . |
| . | . |
| n | 1 |

Since the new window given the display priority of "1" is at the frontmost position on display screen S, its entire region is visible. When the window with the display priority of "2" overlaps the window with the priority "1," the former window lies behind the later one. Therefore, that portion of the window with the priority "2" which overlaps the window with the priority "1" is invisible. Since the window with the display priority of "3" has a lower priority than those having priorities "2" and "1," that portion of the window with the priority "3" which overlaps the window with the priority "2" or "1" is invisible on the display screen. As RAM 40 stores data representing the display priority of each window opened on the display screen, it will be referred to as "window priority memory" in the following description.

The data in window priority memory 40 which specifies the window having the highest display priority, i.e., the active window) is supplied to input controller 12. Consequently, input controller 12 can manage in which window on the display screen S the information currently entered by the operator through keyboard 10 is to be written.

FIG. 2A shows the initial status of three windows opened on the screen of CRT display unit 18. The nearly-rectangular region having rounded corners is the display screen. The data table of window managing unit 38 for this case is as shown in Table 4 below.

TABLE 4

| Window No. | Display Priority |
|---|---|
| 01 | 3 |
| 02 | 2 |
| 03 | 1 |

As windows W1, W2 and W3, having window numbers "01," "02" and "03" respectively, are given the display priorities determined according to the order they have been opened, the newest window W3 is displayed to be in front of the other two, which are hidden behind window W3. In FIG. 2A, the cursor is indicated by the fat line denoted by "C."

An arithmetic and logic unit (ALU) 42 is connected to cursor position memory 32 and window area memory 38, so that it can access these memories. Accordingly, ALU 42 receives the present-cursor position data that is always updated, from memory 42 over a signal line 44, and receives the position data of all the windows defined in Table 3 or 4, from memory 38 over a signal line 46. Based on the output from memories 32 and 38, ALU 42 automatically detects in real time in which window on the display screen S the cursor C lies. Specifically, ALU 42 compares the present position data of the cursor C with the coordiate data defining the position and the size of every window Wi (i=1, 2, 3, . . . ) one by one. Here, ALU 42 correlates the present-cursor position data with x and y coordinates (see Table 2) of two corner points (upper left and lower right) that define each rectangular window on the display screen, and determines whether the cursor C has moved within a single window or has moved from one window to another. When ALU 42 detects a change in the window which contains the cursor C, it generates a detection signal 48. In the case of FIG. 2A, the cursor C is only on window W3. Now when the cursor C moves with the movement of mouse 18 and is detected by the coordinate-data correlation to lie on window W2, ALU 42 generates detection signal 48 representing the change in the windows. This signal 48 is transferred to a sub CPU 50.

Sub CPU 50 performs internal control operations necessary for automatically making the desired window active. As shown in FIG. 2B, when the window containing the cursor C varies from window W3 to window W2, in response to detection signal 48, sub CPU 50 updates the contents of window priority memory 40 so as to change the display priority of window W2 to the highest. As a result, the contents of memory 40 are rewritten as follows.

TABLE 5

| Window No. | Display Priority |
|---|---|
| 01 | 3 |
| 02 | 1 |
| 03 | 2 |

Unless the moving cursor C further moves into another window, the priority of window W2 does not change. For example, even when the cursor C lies over other windows W1 and W3 but still lies in window W2 as shown in FIG. 2C, the priority of the window W2 is kept the highest. Naturally, window W2 is also considered active in this case.

Sub CPU 50 is connected to window priority memory 32 as well as to refresh image memory 26. Upon completion of rewriting the contents of window priority memory 40, sub CPU 50 secures a memory region in image memory 26 that corresponds to the position and the size of the currently-active window W2. Sub CPU 50 then secures a memory region in image memory 26 that corresponds to the position and the size of window W3 given the second highest priority. That portion of window W3 which is under window W2 is not secured in image memory 26. Finally, sub CPU 50 secures a memory region in image memory 26 that corresponds to the position and size of window W1 given the lowest priority. That portion of window W1 which lies under either window W2 or W3 is not secured in image memory 26.

Information such as character data and/or graphic data is temporarily stored in initial data memory 54 of window presentation controlling section 30 through a data bus 52. Referring again to FIG. 2B, three independent types of information that are entered via keyboard 10 to be resepctively written on windows W1, W2 and W3 are temporarily stored in internal data memory 54 in association with their respective windows W1-W3. When window W2 becomes active as has been explained above, sub CPU 50 accesses memory 54 and read outs from the memory the information (e.g., character data, such as an office document prepared by the operator) that has been entered to be written on window W2. The entire read-out information is transferred, under the control of sub CPU 50, to refresh image memory 26 and stored in the memory region there that has been secured for active window W2 in the aforementioned manner. Subsequently, sub CPU 50 accesses memory 54 and reads therefrom the information (e.g., character data, such as dictionary information that has been referred to prepare the office document) that has been entered to be written on window W1. Part of the read-out information which corresponds to the overlapping region of windows W1 and W2 is deleted under the control of sub CPU 50. Only the remaining portion of the information (i.e., the information that should be written on the visible L-shaped region of window W1 in FIG. 2B) is transferred to refresh image memory 26 and stored in the memory region secured for window W1. Similarly, sub CPU 50 accesses memory 54 and read therefrom the information (e.g., graphic data, such as reference diagrams of the office document) that has been entered to be written on window W3. Part of the read-out information which corresponds to the region of window W3 lying under either window W1 or W2 is deleted under the control of sub CPU 50. Only the remaining portion of the information (i.e., the information that should be written on the visible psuedo W- shaped region of window W3 in FIG. 2B) is transferred to refresh image memory 26 and stored in the memory region secured for window W3. The image information thus stored in refresh image memory 26 is transferred to CRT display unit 18 through display controller 28 and is displayed there as a single bit-mapped image. This displayed image is equivalent to the overlapping windows shown in FIG. 2B.

Even when the cursor C moves with movement of mouse 16 to the position where three windows W1-W3 overlap as shown in FIG. 2C, the display priority of window W2 does not change as has been explained above and window W2 thus remains active. In FIG. 2C, the invisible or hidden portions of windows W2 and W3 are indicated by broken lines for the purpose of easier visual confirmation of the cursor position.

Figure 2D:
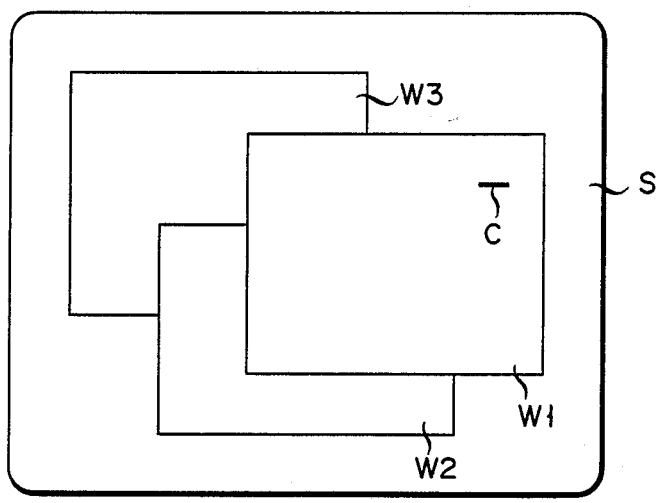

When the cursor C further moves on the display screen S and reaches where it lies only on window W1 as shown in FIG. 2D, window W1 is immediately and automatically made active and is popped up to the front. More specifically, when the cursor C is positioned as shown in FIG. 2D, ALU 42 compares the present-cursor position data from cursor position memory 32 with the regional data of every window stored in window area memory 38 and detects the change in (switching of) the window to be made active. Based on the detection result of ALU 42, sub CPU 50 updates the contents of window priority memory 40 so that the window W1 is given the highest priority this time. The updated contents of memory 40 are as shown in Table 6 below.

TABLE 6

| Window No. | Display Priority |
| --- | --- |
| 01 | 1 |
| 02 | 2 |
| 03 | 3 |

Figure 3:
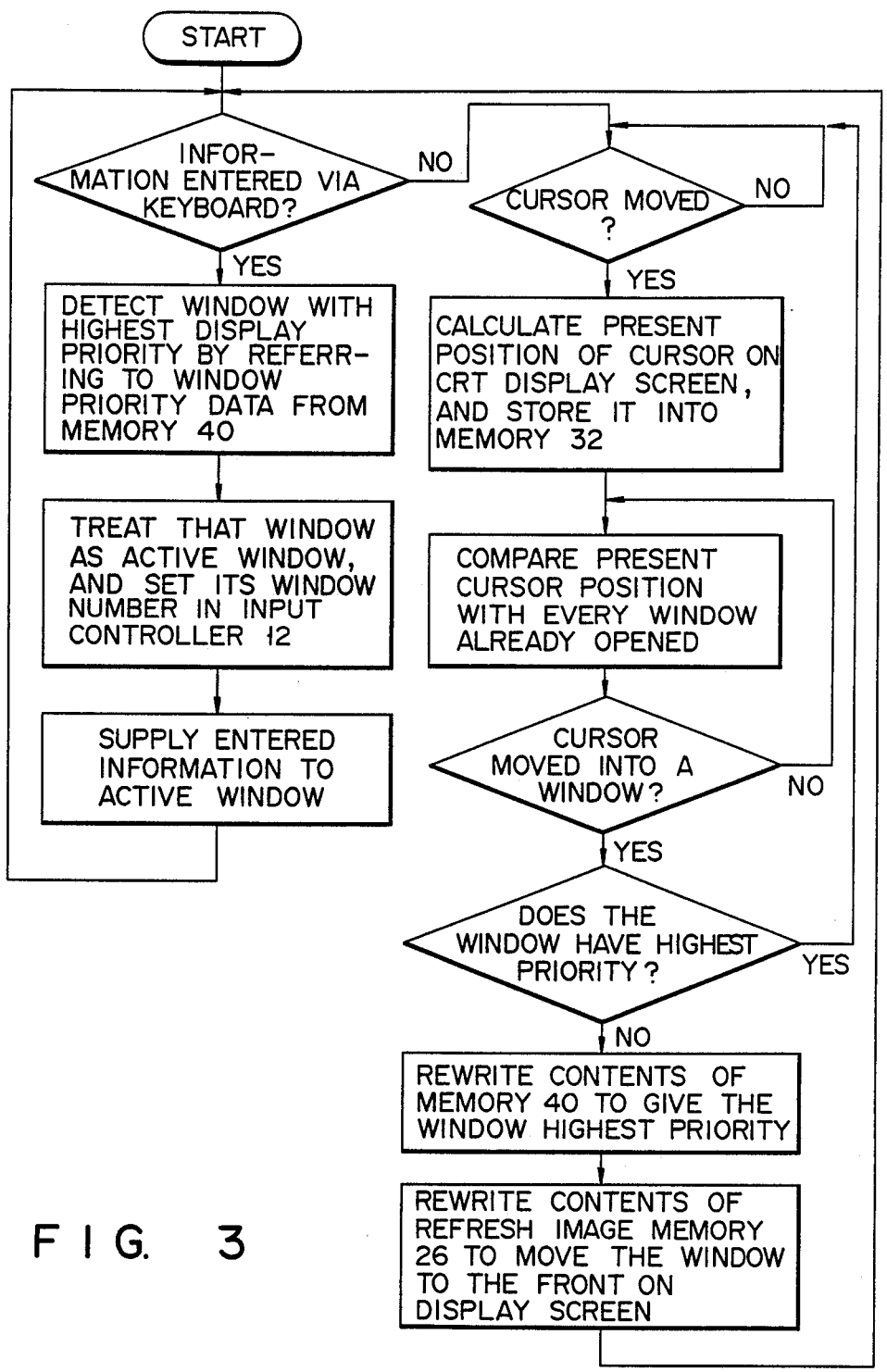
FIG. 3 is a flowchart showing a sequence of main functions of the multiwindow display control device shown in FIG. 1.

In the same manner explained for FIG. 2C, sub CPU 50 accesses internal data memory 54 and refresh image memory 26 and forms in memory 26 an image pattern corresponding to what is shown in FIG. 2D. Therefore, the display on the display screen S is changed from the window-overlapping pattern of FIG. 2B to that of FIG. 2D substantially the same moment the cursor C moves to the position of FIG. 2D. Main processes of the aforementioned window presentation control are given in the flowchart of FIG. 3.

With the use of the multiwindow display device having the above arrangement, when a plurality of windows W1, W2 and W3 are opened on the screen S of CRT display unit 18 and the cursor C moves onto one of the windows with movement of mouse 16, that window is automatically rendered active. When the cursor C moves to the visible portion of either of the remaining back windows, i.e., when the window containing the cursor C changes, the display on the screen S is changed by window presentation controlling section 30 in such a way that the selected back window is automatically rendered active and is popped up to the frontmost position. This completely eliminates the need for the operator to manually press a mouse button and/or enter special control codes via keyboard 10 to specify a desired window or to change the active window on the screen S. The only operation required for the operator is to move the cursor C onto the desired window. Accordingly, the operator can specify a desired window or change the active window to the desired one quickly and at any time without interrupting the thought occupied by the presently-executing task. This can maximize the use of the advantages of the multiwindow function as well as improve the efficiency of the operator to execute office works.

In addition, since the embodiment of the present invention employs a special-purposed hardware for detection of the present position of the cursor and management of the related data, it is possible to maximize the speed of switching active windows on the display screen. This also contributes to maximizing the autoswitching of active windows.

Although the present invention has been descirbed with reference to a specific embodiment, it should be understood by those skilled in the art that numerous modifications may be made within the spirit and scope of the invention contribution.

For example, some hardware may be replaced where necessary by software program as needed, without departing from the basic technical principle of the aforementioned auto-window presentation. In this example, it is likely that the active window switching speed can be increased by improving the processing ability of involved CPUs. Further, ALU 42 is not restricted to perform the correlation between the present-cursor position data with the window coordinate data defining the position and the size of each window, only in the aforementioned manner; this correlation may also be modified in various ways.

What is claimed is:

1. A multi-window display apparatus, comprising:
   display means having a display screen for displaying window serving as independent image display regions on said display screen in such a manner as to allow said windows to overlap one upon another;
   cursor display means, connected to said display means, for moving a cursor displayed on said display screen of said display means in accordance with a manual operation by an operator;
   first memory means, connected to said display means, for storing plural pieces of window coordinate data specifying positions and sizes of said windows displayed on said display screen;
   second memory means, connected to said cursor display means, for storing data of most current coordinates of said cursor on said display screen, as present-cursor position data; and
   window control means, connected to said first and second memory means and said display means, for comparing said present-cursor position data with said plural pieces of said window coordinate data, detecting when said cursor moves into one of said windows, and controlling said display means so as to automatically move one of said windows in which said cursor moves in front of the other windows on said display screen, said one of said windows being entirely visible while said other windows are hidden at least partially behind said one of said windows;
   said window control means comprising:
   first processing means for initially determining display priorities of said window according to the order said windows are formed, and for generating window priority data;
   third memory means, connected to said first processing means, for receiving said window priority data and for storing data of said display priorities of said windows; and second processing means, connected to said third memory means, for comparing said present-cursor position data with said plural pieces of said window coordinate data, and for, when said cursor is detected to have mvoed into one window, rewriting contents of said third memory means in such a manner that said display priorities of said windows are updated to give said one window the highest display priority, said one window having the highest display priority being displayed as an active window.

2. The apparatus according to claim 1, wherein when said window control means detects that said cursor moves from that window on which said cursor presently lies, to another window, said window control means makes said another window active and move said active window in front of the other windows.

3. The apparatus according to claim 2, wherein when said window control means detects that said cursor moves from that window on which said cursor presently lies, to lie on other windows, said window control means determines whether or not said other windows include said active window, and when the determination is affirmative, said window control means keeps said active window active.

4. The apparatus according to claim 1, further comprising:
cursor movement instructing means, connected to said cursor display means and adapted to be manually operated by said operator to continuously move said cursor displayed on said display screen.

5. The apparatus according to claim 4, wherein said cursor movement instructing means includes a coordinate pointing device.

6. A computer system comprising:
first input means for inputting information;
display means having a display screen for displaying said input information on said display screen;
second input means adapted to be manually operated by an operator in such a manner that a cursor displayed on said display means is moved as desired and windows are formed on said display screen of said display means and allowed to overlap one upon another;
cursor position managing means, connected to said second input means and said display means, for calculating in real time most current coordinates of said cursor in response to movement of said cursor defined by said second input means, and outputting said calculated coordinates of said cursor as present-cursor position data, said calculated coordinates of said cursor always being subjected to updating; and
window presentation managing means, connected to said second input means and said display means, for detecting when said cursor moves from one window to another window on said display screen and automatically making said another window active;
said window presentation managing means comprises window managing means for generating plural pieces of window coordinate data defining positions and occupying-areas, on said display screen, for said windows specified by said second input means, and plural pieces of window priority data defining display priorities of said windows on said display screen;
said window presentation managing means further comprising arithmetic operation means, connected to said cursor position managing means and said window managing means, for comparing said present-cursor position data with said plural pieces of said window coordinate data, and detecting when said cursor moves from one window to another window on said display screen and generating a detection signal; and
said window presentation managing means further comprising control means, connected to said arithmetic operation means and said window managing means, for rewriting plural pieces of said window priority data so as to give said another window the highest display priority in response to said detection signal, whereby said another window having the highest display priority is moved in front of the other windows on said display screen.

7. The computer system according to claim 6, wherein said cursor position managing means comprises random access memory means, connected to said second input means, for storing said calculated present-cursor position data and cursor position data immediately preceding to said calculated present-cursor position data.

8. The computer system according to claim 7, wherein said window managing means comprises second random access memory means for storing said plural pieces of window coordinate data and said plural pieces of priority data.

9. A multi-window display method comprising the steps of:
displaying windows serving as independent image display regions in such a manner that said windows are allowed to overlap one upon another on a display screen of a display device;
calculating plural pieces of data specifying positions and sizes of said windows on said display screen:
detecting coordinates of a movable cursor on said display screen; and
comparing a present position of said cursor with said positions and sizes of said windows, and, when said cursor is detected to have moved into one of said windows on said display screen, controlling said display device so as to automatically move said one window in front of the other windows on said display screen, said one window being entirely visible while said other windows are hidden at least partially behind said one window;
automatically activating another window and moving said another window in front of the other windows when said cursor is detected to have moved from one window to said another window;
determining whether or not said other windows include an active window when said cursor is detected to have from one window to lie on other windows, and keeping active said active window when the determination is affirmative; and
determining initial display priorities of said windows on said display screen in accordance with the order said windows are formed and stored in a memory section as windows priority data; and
updating said display priorities of said windows to give a particular window the highest display priority when said cursor is detected to have moved to lie on said particular window on said display screen, and displaying said particular window having the highest display priority as said active window.

* * * * *